United States Patent Office 3,072,723
Patented Jan. 8, 1963

3,072,723
PROCESS FOR MANUFACTURE OF ACYLAMINO-CARBOXYLIC ACID AMIDES
Max Brenner, Riehen, Switzerland, assignor to Ciba Corporation, a corporation of Delaware
No Drawing. Filed July 21, 1958, Ser. No. 749,641
Claims priority, application Switzerland July 22, 1957
4 Claims. (Cl. 260—561)

This invention relates to a new process for the manufacture of acylamino-carboxylic acid amides by a rearrangement reaction.

In my application Serial No. 595,080, filed July 2, 1956, now U.S. Patent No. 2,850,491, is described a new process for the manufacture of peptides. In that process a compound, for example, of the formula

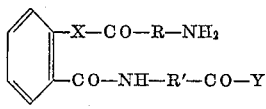

in which X represents an oxygen or sulfur atom, R and R' each represent the divalent radical remaining after deduction of the amino and carboxyl groups from an amino-acid, and Y represents the radical of an amino-acid or of a peptide, is treated with a basic agent, whereby rearrangement takes place to form a compound of the formula

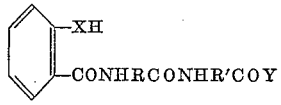

There is also described in my application Serial No. 689,474, filed October 11, 1957, the rearrangement of α-aminocarboxylic acid esters of aliphatic β-hydroxy or β-mercaptocarboxylic acid amides to form the corresponding β-oxyacyl- or β-mercaptoacyl-α-amino-carboxylic acid amides.

The present invention is based on the unexpected observation that β-amino-carboxylic acid esters of aliphatic α-hydroxy- or α-mercapto-carboxylic acid amides containing at least one free amide hydrogen atom and at least one free aminohydrogen atom are capable of undergoing an analogous rearrangement, whereby the corresponding α-oxyacyl- or α-mercaptoacyl-β-aminocarboxylic acid amides are obtained.

The reaction may be represented schematically as

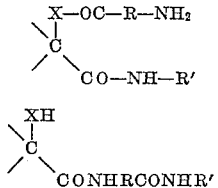

in which X represents an oxygen or sulfur atom, R represents a divalent radical remaining after deduction of the amino and carboxyl groups from a β-amino-carboxylic acid, R' represents hydrogen or an organic radical, especially the radical of an amino-acid or of a peptide. When R' represents hydrogen, there are obtained simple α-oxyacyl- or α-mercaptoacyl-β-aminocarboxyl acid amides. However, when R' is the radical of an amino acid or a peptide, there is obtained an α-hydroxy-acyl- or α-mercaptoacyl-peptide or an α-oxyacyl- or α-mercaptoacyl-peptide extended by one β-amino-acid. By esterifying the hydroxyl- or mercapto-group with a further β-amino-acid and repeating the rearrangement the polypeptide chain can be extended in a very simple manner by the addition of any desired number of the same or different β-amino-acid radicals.

The rearrangement described above is carried out with basic condensing agents. It has been found that it is necessary in the rearrangement of β-amino carboxylic acid esters of aliphatic α-hydroxycarboxylic acid amides to use strongly basic agents and advantageously to work in a medium in which substantially no hydrolysis of the ester group occurs. Strongly basic condensing agents suitable for the reaction are more especially those capable of ionising an amide group. There may be mentioned principally hydrocarbon compounds, amides or tertiary alcoholates of alkali metals or alkaline earth metals, for example, sodamide, potassium tertiary butylate, sodium-phenyl and lithium-phenyl. The medium in which the metal amides are used is advantageously liquid ammonia, and in the case of the tertiary alcoholates the corresponding alcohols may be used. The reaction temperature may vary within wide limits. Especially good results are obtained when the reaction is carried out at a temperature below 30° C.

Accordingly the process of this invention for the manufacture of acylamino-carboxylic acid amides is characterised in that a β-amino-carboxylic acid ester of an aliphatic α-hydroxy- or α-mercapto-carboxylic acid amide containing at least one free amide and amino hydrogen atom, or a salt of such a compound, is subjected to rearrangement to form the corresponding acyl-β-aminocarboxylic acid amide by treatment with a basic agent, and advantageously one which is capable of ionising amide groups.

The compounds used as starting materials may contain as α-hydroxy- or α-mercapto-acyl radical the radical of an aliphatic and especially of a lower aliphatic α-hydroxy- or α-mercapto carboxylic acid.

Any reactive functional groups, for example, free hydroxyl, thiol, carboxyl or amino groups not taking part in the rearrangement, present in the starting materials are protected in the usual manner.

The starting materials are known or can be made by methods in themselves known or, if desired, by the process of this invention.

The following example illustrates the invention:

EXAMPLE

Glycolyl-β-Alanine-Amide From O-(β-Alanyl)-Glycollic Acid Amide

A solution of 156 milligrams (4 millimols) of potassium in 25 millimols of tertiary butanol is added to a solution of O-(β-alanyl)-glycollic acid amide in a mixture of dioxane and tertiary butanol, which has been prepared by the hydrogenolysis of 560 milligrams (2 millimols) of O-(carbobenzyloxy-β-alanyl)-glycollic acid amide in the presence of 300 milligrams of palladium charcoal of 10% strength, 15 millimols of tertiary butanol followed by filtration. After agitating the mixture for 2 hours at room temperature it is poured into 50 millimols of water and about 2 grams of Amberlite IR-120 (H-form) are added. After 15 minutes the solution is neutral. It is evaporated in vacuo. By crystallization from a mixture of methanol and ether there is obtained glycoloyl-β-alanine amide melting at 116–117° C.

The O-(carbobenzyloxy-β-alanyl)-glycollic acid amide may be prepared as follows:

6.5 grams (30 millimols) of carbobenzyloxy-β-alanine are dissolved in 50 millimols of tetrahydrofurane and after the addition of 4.6 ml. (33 millimols) of triethylamine the whole is cooled to −70° C. A solution of 33 millimols of phosgene in toluene is added, the whole is allowed to stand for 20 minutes at −70° C., and a previously cooled solution of 2.25 grams (30 millimols) of glycollic acid amide in 20 ml. of absolute pyridine is added and the mixture is allowed to stand for 14 hours at 0° C. After distilling off the solvent in vacuo, the residue is taken up in 2 N-hydrochloric acid and ethyl acetate, the solution is washed with 2 N-hydrochloric acid, potassium hydrogen carbonate solution of 10% strength and water, dried over sodium sulfate and evaporated in vacuo. A crystalline residue remains behind (5 grams=60%)

melting at 92–100° C. By recrystallizing the residue from a mixture of chloroform and ether (1:1) there is obtained a product having a double melting point of 92–90° C. and 101° C., the prismatic rods changing at 92° C. into needles.

What is claimed is:

1. Process for the manufacture of acylamino-carboxylic acid amides, wherein a member selected from the group consisting of β-primary amino-carboxylic acid esters of lower aliphatic α-hydroxy- and α-mercapto-carboxylic acid amides having at least one free amide hydrogen atom and at least one free aminohydrogen atom and being devoid of additional reactive groups, is rearranged by treatment with basic agents capable of ionizing an amide group to form the corresponding acyl-β-aminocarboxylic acid amides, said basic agents being selected from the group consisting of alkali metal and alkaline earth metal compounds of hydrocarbons, amides and tertiary alcohols.

2. Process according to claim 1, wherein a member selected from the group consisting of β-primary aminocarboxylic acid esters of lower aliphatic α-hydroxycarboxylic acid amides having at least one free amide and hydrogen atom and at least one free amino hydrogen atom, is rearranged by treatment with basic agents capable of ionizing an amide group, said basic agents being selected from the group consisting of hydrocarbon compounds, amides, tertiary alcoholates of alkali metals and tertiary alcoholates of alkaline earth metals.

3. Process according to claim 2, wherein the basic agent used is a member selected from the group consisting of an alkali metal and alkaline earth metal-tertiary alcoholate in a tertiary alkanol, and an alkali metal and alkaline earth metal-amide in liquid ammonia.

4. Process according to claim 1, wherein esters of β-primary amino-acids with glycollic acid amides are used as starting materials.

References Cited in the file of this patent

Beilstein: Vol. IV and (2nd ed.), page 801 (1942).